United States Patent [19]
Christensen

[11] Patent Number: 5,641,190
[45] Date of Patent: Jun. 24, 1997

[54] POWER-OPERATED GRIPPING DEVICE WITH TWO JAWS

[76] Inventor: Ib Bergmann Christensen, Sonnerupvej 11, Brønshøj, Denmark, 2700

[21] Appl. No.: 481,537
[22] PCT Filed: Dec. 7, 1993
[86] PCT No.: PCT/DK93/00409
  § 371 Date: Jul. 6, 1995
  § 102(e) Date: Jul. 6, 1995
[87] PCT Pub. No.: WO94/15759
  PCT Pub. Date: Jul. 21, 1994

[30] Foreign Application Priority Data

Jan. 12, 1993 [DK] Denmark ................ 0030/93

[51] Int. Cl.⁶ .............................................. B66C 1/42
[52] U.S. Cl. ......................... 294/88; 294/104; 294/116
[58] Field of Search ......................... 294/88, 104, 106, 294/115, 116; 901/37; 269/27, 32, 34

[56] References Cited

U.S. PATENT DOCUMENTS

| | | | |
|---|---|---|---|
| 976,052 | 11/1910 | Devine | 294/116 |
| 1,900,194 | 3/1933 | Niemi | 294/116 |
| 2,527,922 | 10/1950 | Falkner | 294/104 |
| 3,013,835 | 12/1961 | Blatt | 294/88 |
| 5,033,785 | 7/1991 | Woolley, Jr. | 294/116 |

FOREIGN PATENT DOCUMENTS

| | | | |
|---|---|---|---|
| 3808822 | 9/1989 | Germany. | |
| 570961 | 7/1945 | United Kingdom | 294/116 |

Primary Examiner—Dean Kramer
Attorney, Agent, or Firm—McAulay Fisher Nissen Goldberg & Kiel, LLP

[57] ABSTRACT

A gripping device for use in pressing together two radially protruding ends of a hose clamp constituting a spring wire which is wound into a single loop or coil, the diameter of which can be increased by pressing together the two ends of the spring wire. The gripping device has a rigid jaw with a movable jaw hinged thereto, the jaws having gripping devices for gripping the free ends of the spring wire of the hose champ. The relative movement of the jaws is controlled by a first roller and a second roller, the rollers being seated in a roller head, which is moveable and parallel with an additional roller path of the rigid jaw. During movement, the first roller bears against the additional roller path and the second roller against another roller path as a result of which the friction between the individual parts of the gripping device is reduced to a minimum. In addition, the force of the moveable jaw will increase with a degree of closure without increasing the force applied by a work cylinder to compress the spring.

9 Claims, 10 Drawing Sheets

POWER-OPERATED GRIPPING DEVICE WITH TWO JAWS

The present invention relates to a gripping device comprising two fingers or jaws, the first jaw being rigid and the second jaw acting like a lever being rotatable on a shaft provided in the first jaw. The gripping device has a work cylinder for moving the second jaw, the piston rod of the work cylinder being adapted to exert a power in a direction which is substantially the longitudinal direction of the jaws, and a mechanism for transferring the power of the piston rod to the second jaw at a point which is located between the shaft and the free end or nose of the jaws, said mechanism consisting of a roller, which is secured to the outer end of the piston rod and is adapted to roll in a link or roller path of the second jaw, and an additional link or roller path, which is rectilinear and parallel with the axis of the work cylinder.

A gripping device of the above described type is particularly but not exclusively designed for mounting and dismounting hose clamps consisting of spring wire, which can clamp a hose end firmly and tightly around a connecting branch or similar object due to its elastic force, the spring wire being formed as a loop extending at least one complete revolution around the end of the hose for the formation of a ring having a diameter which is slightly smaller than that of the end of the hose in the mounted position of the hose clamp, and wherein the two ends of the spring wire extend radially a short distance outwards from the loop. The spring wire may have a circular or a rectangular section.

Hose clamps of the above type are mounted or dismounted by forcing the two ends of the spring wire being clamped together, whereby the diameter of the loop is increased to such a degree that the hose clamp can be brought in and around the end of the hose or taken away from it. For hose clamps of thick spring wire, the power needed for clamping together the two spring ends is so considerable as to require use of a power-operated gripping device.

A power-operated gripping device can either be manually held by an operator and released in a manual operation of the gripping device, or the gripping device can be mounted on a robot arm.

A gripping device of the described type is for example known from U.S. Pat. No. 3,013,835. In this known gripping device the movement of the piston rod is transferred to the first jaw by means of a roller, which slides in a groove of the said first jaw, while the end of the piston rod is controlled by a slide bar, which is movable in a longitudinal guide of the second jaw.

A similar arrangement is known from DE Printed Specification no. 38 08 822.

The drawbacks of the known gripping devices are that concurrently with the closing of the jaws, a steadily increasing power is required on the part of the work cylinder since there is a comparatively high friction between the individual parts of the gripping devices due to the geometry of the constructions, as a result of which a large amount of energy is consumed in the operation of the gripping devices.

It is therefore an object of the invention to provide such construction of a gripping device that the work cylinder exerts the least possible power during the pressing together of the jaws to the effect that energy can be saved during operation, the construction being designed to reduce the friction between the individual parts of the gripping device.

This object is achieved by means of a gripping device of the type described in the introduction, which is characteristic in that the first roller is secured to a roller head, which has an additional roller, which cooperates with the mentioned additional link or roller path in the first jaw, and that means have been provided for opening of the jaws.

The power of the piston rod of the cylinder is thus transferred via a link guide and rollers to the arm of the movable arm of the jaw between the jaw and its axis of rotation, whereby the power exerted on the jaw will increase with the degree of closure without increasing the power exerted by the work cylinder, the friction between the movable parts of the gripping device thus being reduced to the minimum amount possible. As a result of the reduction of the friction, the life of the movable parts of the gripping device is increased, and thus an economical advantage achieved.

In addition, the gripping device according to the invention constitutes a unit, which can be mounted on work cylinders of any size.

The dependent claims relate to embodiments of the gripping device according to the invention, and the advantages of these embodiments will be apparent from the explanation given below.

The gripping device according to the invention will be explained in detail below with reference to the accompanying drawing, wherein

DETAILED DESCRIPTION OF THE INVENTION

Initially three main parts will be explained in a first embodiment of a gripping device according to the invention.

Figure 1:
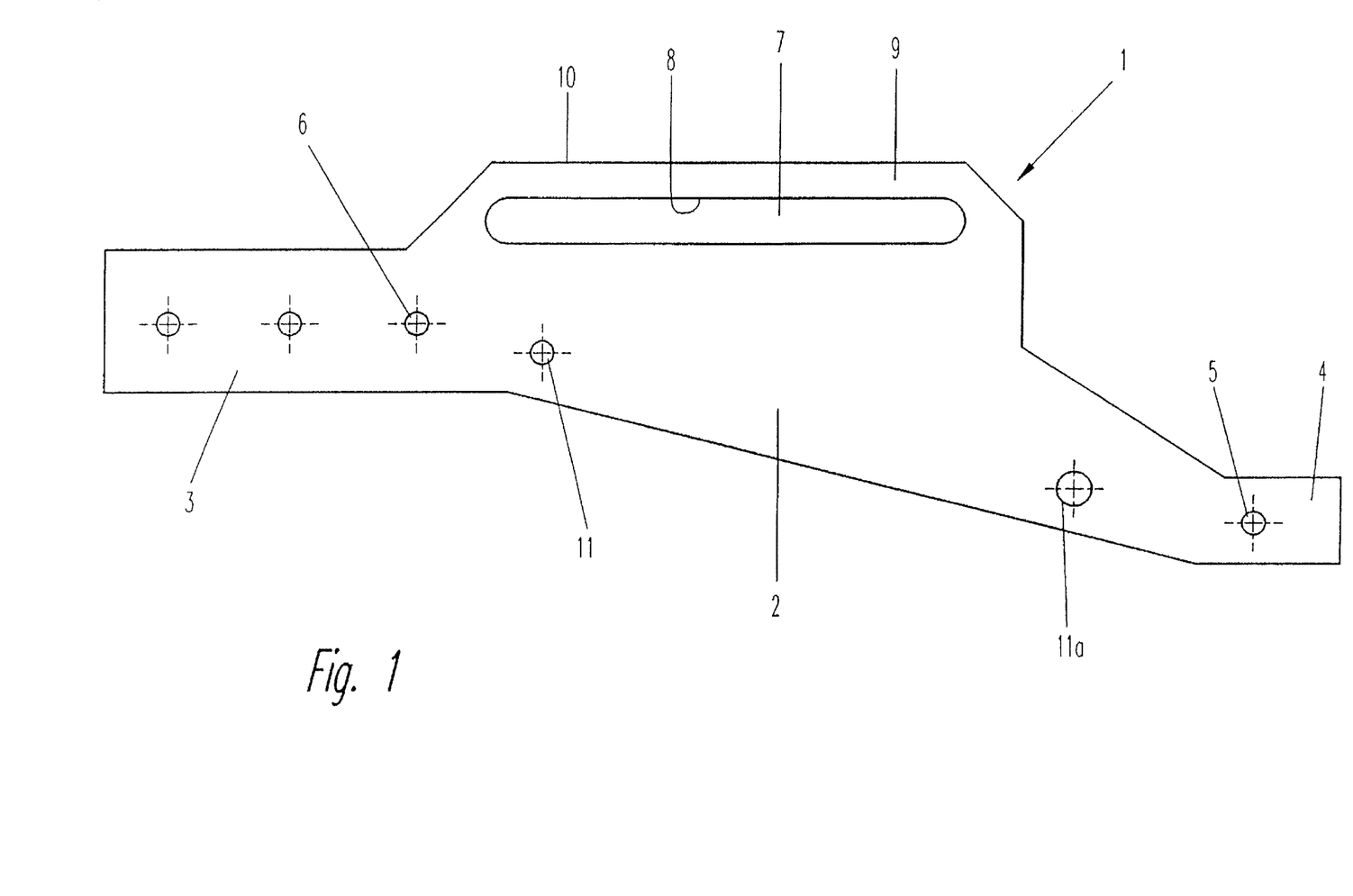
FIG. 1 is a side view of a rigid jaw in a first embodiment of a gripping device according to the invention.

The rigid jaw, which is illustrated in FIG. 1, is as a whole referred to as 1 and has a body 2, which is provided with a shank 3, which serves to connect the rigid jaw 1 with a work cylinder, which is not illustrated. As illustrated, the rigid jaw 1 has an irregular long shape and is made of plate material, such as steel, having a thickness of for example 3 mm.

Figure 9:
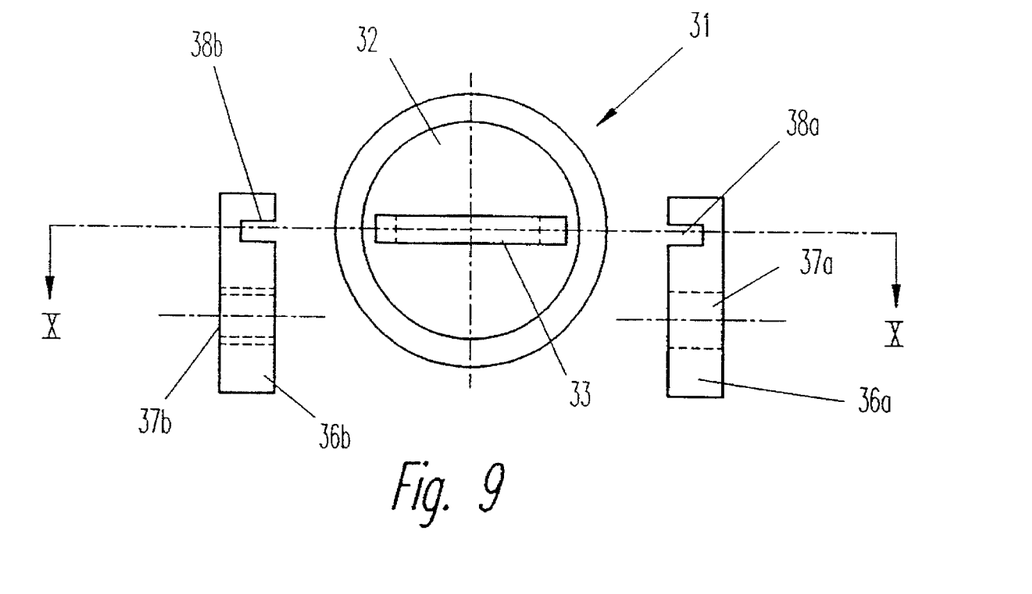
FIG. 9 is an end view of a gripping device with appertaining clamp fitting.
Figure 10:
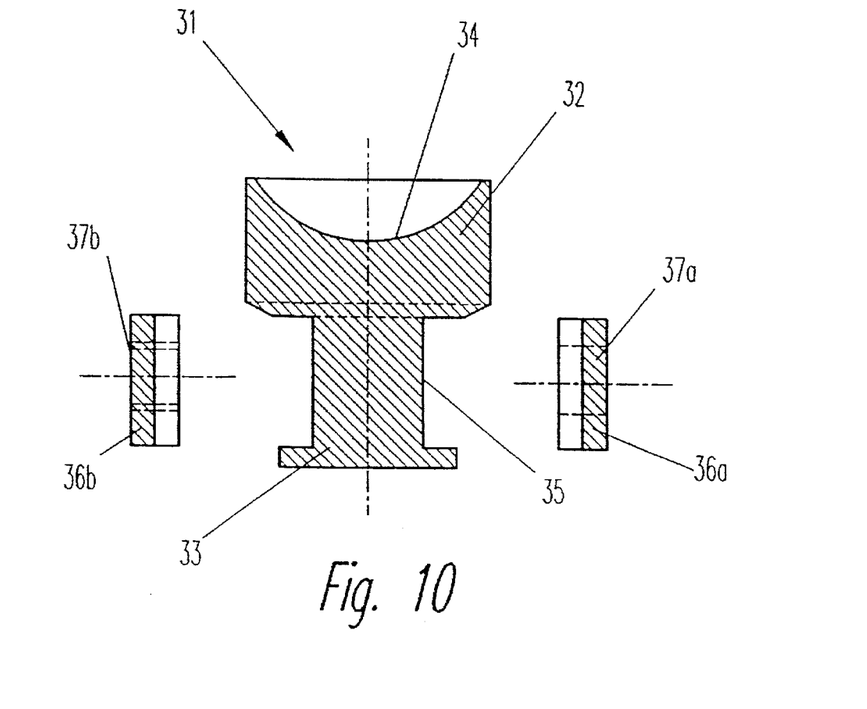
FIG. 10 illustrates the section marked X—X shown in FIG. 9 of a gripping device with appertaining clamp fitting.

At the end opposite the shank 3 the body 2 is extended like a nose 4 adapted to receive a gripping device 31, which is illustrated in FIGS. 9 and 10, to retrieve one free end of the spring wire of a hose clamp of the type described in the introduction, however, it will be understood that the gripping device according to the invention with appropriately designed gripping devices can be used to clamp together other objects.

The mentioned gripping device 31 may be fastened to the nose 4 by means of a screw or similar object, which is driven through the clamp fitting of the gripping device 31 as well as through the hole 5 of the nose 4. The shank 3 is similarly provided with holes 6 for securing the body 2 to the work cylinder.

The body 2 has a longitudinal groove 7 extending along the upper side 10 of the body 2 and in parallel with the longitudinal direction of the shank 3, and thus also the longitudinal direction of the work cylinder in the mounted position of the gripping device.

The inner side of the groove 7 located nearest to the upper side 10 forms an additional roller path or a link 8 for a roller head, which will be explained below. The upper side 10 and the roller path 8 define a beam 9.

Figure 2:
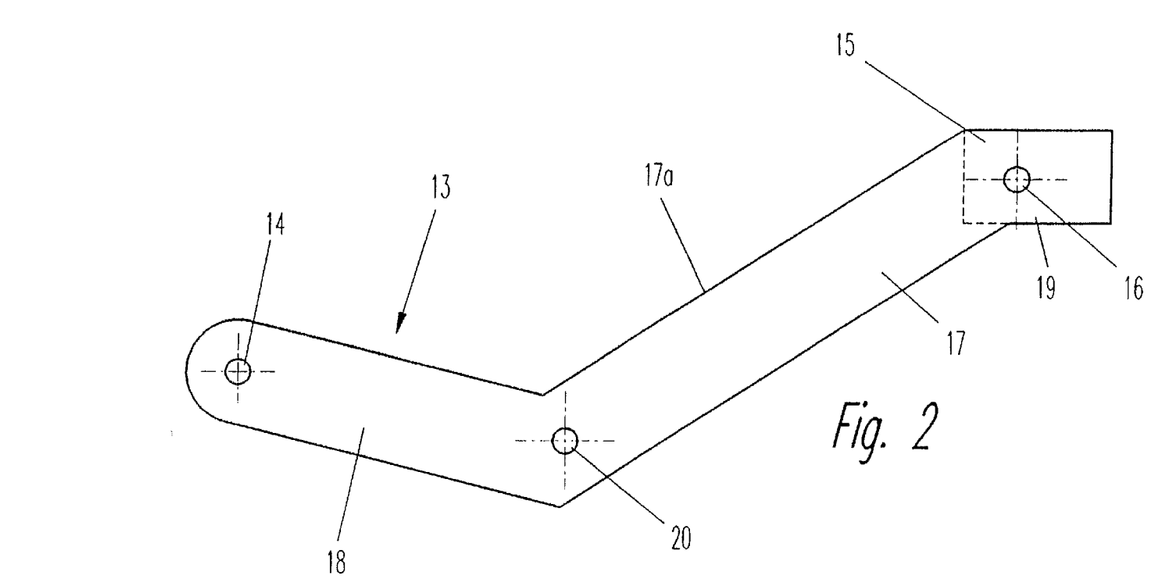
FIG. 2 is a side view of a movable jaw in a first embodiment of a gripping device according to the invention.
Figure 3:
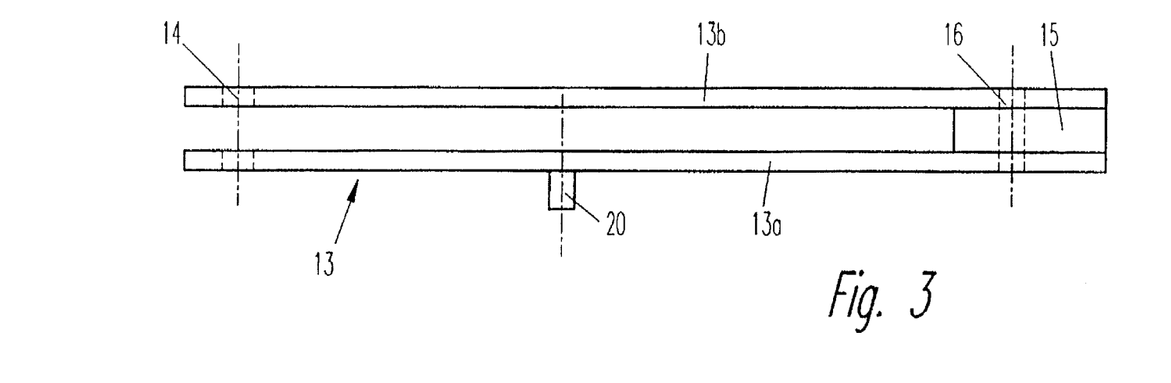
FIG. 3 is a plane view of the movable jaw illustrated in FIG. 2.

The body 2 also has a bore 11 for a shaft 12 for a movable jaw 13, which is illustrated in FIGS. 2 and 3. The movable jaw 13 is constituted by two identical pieces of plate material 13a, 13b, such as steel, having a thickness of for example 2 mm, said two pieces 13a, 13b being joined at at least one end by means of a piece of plate 15, which is inserted between the said plate pieces, whereby the piece of plate 15 is of such thickness that the body 2 can be accommodated slidingly between the pieces of plate 13a, 13b.

The two pieces of plate 13a, 13b consist of a first and a second prong 17, 18, which form an obtuse angle between them. The side of the prong 17 facing the angular space constitutes a roller path or link 17a, which will be explained below.

The end of the piece of plate 15 together with the pieces of plate 13a, 13b, form a nose 19, which structurally corresponds to the nose 4 of the rigid jaw 1 and is provided with a hole 16, by means of which a gripping device 31 illustrated in FIGS. 9 and 10 can be connected to the nose 19. At the opposite end of the movable jaw 13 is provided a bore 14 for the shaft 12 referred to above. Approximately at the middle of the transition between the prongs 17, 18 is disposed a pin 20 on the piece of plate 13a, said pin serving the purpose of supporting a spring which is not shown in the drawing and the significance of which will be explained below.

The said spring is preferably a torsional spring of the type wherein a spring wire is wound into several close-set coils, whereupon the free ends of the spring wire at the axially opposite ends of the coils extend radially from the coils. The structure of the spring thus corresponds to the hose clamps referred to above but has more coils than a hose clamp. By moving the two free wire ends of the spring in planes which are essentially at right angles to the longitudinal axis of the coils, the spring will provide resistance towards such movement.

Figure 4:
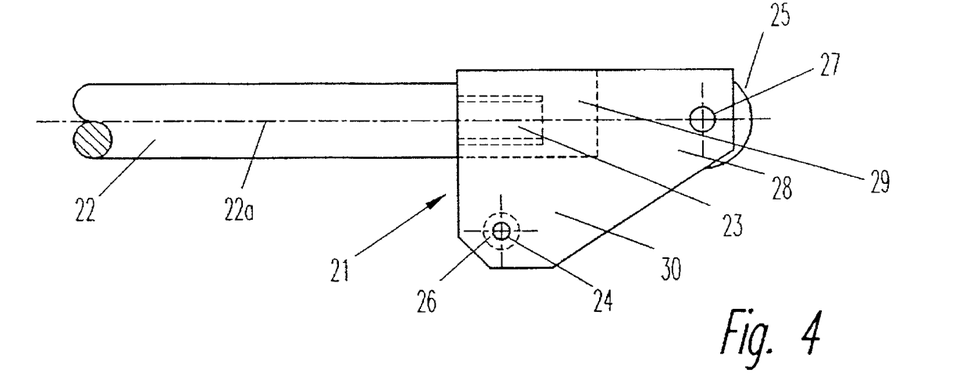
FIG. 4 is a side view of a roller head in a first embodiment of a gripping device according to the invention.
Figure 5:
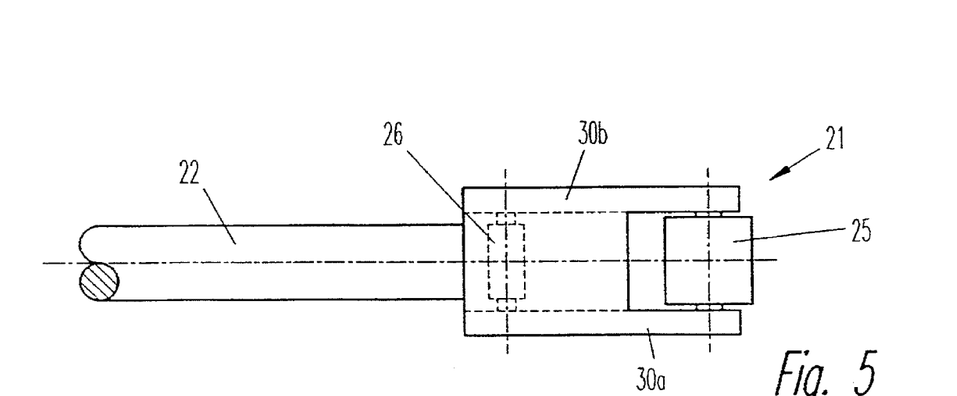
FIG. 5 is a plane view of the roller head illustrated in FIG. 4.
Figure 6:
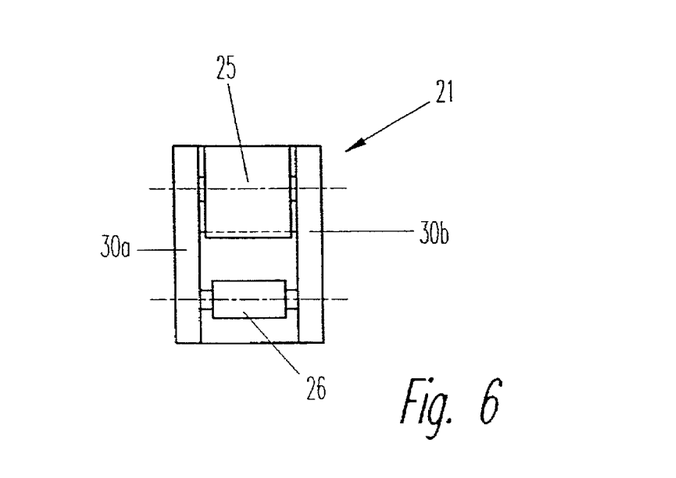
FIG. 6 is an end view of the roller head illustrated in FIG. 4.

FIGS. 4, 5 and 6, which illustrate a roller head 21 made for example from a massive piece of metal, is now referred to.

The roller head 21 has on its front and underside a recess 28, whereby two identical tongues 30a and 30b appear holding the remaining part 29 of the roller head 21 together. The roller head 21 is at one end connected to a piston rod 22 in the work cylinder, which is not illustrated, and said connection may for instance consist in the piston rod 22 being formed as a threaded pin 23, which is screwed into a threaded hole provided in the roller head.

Below the threaded pin 23 the roller head 21 has a bore 24 for a shaft for an additional roller 26, and the roller head 21 has as an extension of the piston rod 22 another transverse bore 27 adapted to accommodate a shaft for a first roller 25, and the rollers 25, 26 are enclosed by the tongues 30a, 30b of the recess 28.

The additional roller 26 has a diameter, which is slightly smaller than the width of the groove 7 in the body 2 of the rigid jaw 1.

The relative positions of the individual parts will now be described.

The movable jaw 13 is mounted rotatably on the rigid jaw 1, the mentioned shaft 12 being led through the bore 14 of the movable jaw 13 and the bore 11 of the rigid jaw 1, whereby the movable jaw 13 can rotate on the shaft 12 in relation to the rigid jaw 1. The mentioned spring is then mounted on the shaft 12, one free end of the spring wire being fastened in relation to the shank 3 of the rigid jaw 1, and the second free end being supported against the stop 20 of the movable jaw 13 in such a manner that the movable jaw 13 is swung into the position illustrated in FIG. 7 by means of the spring power.

Figure 7:
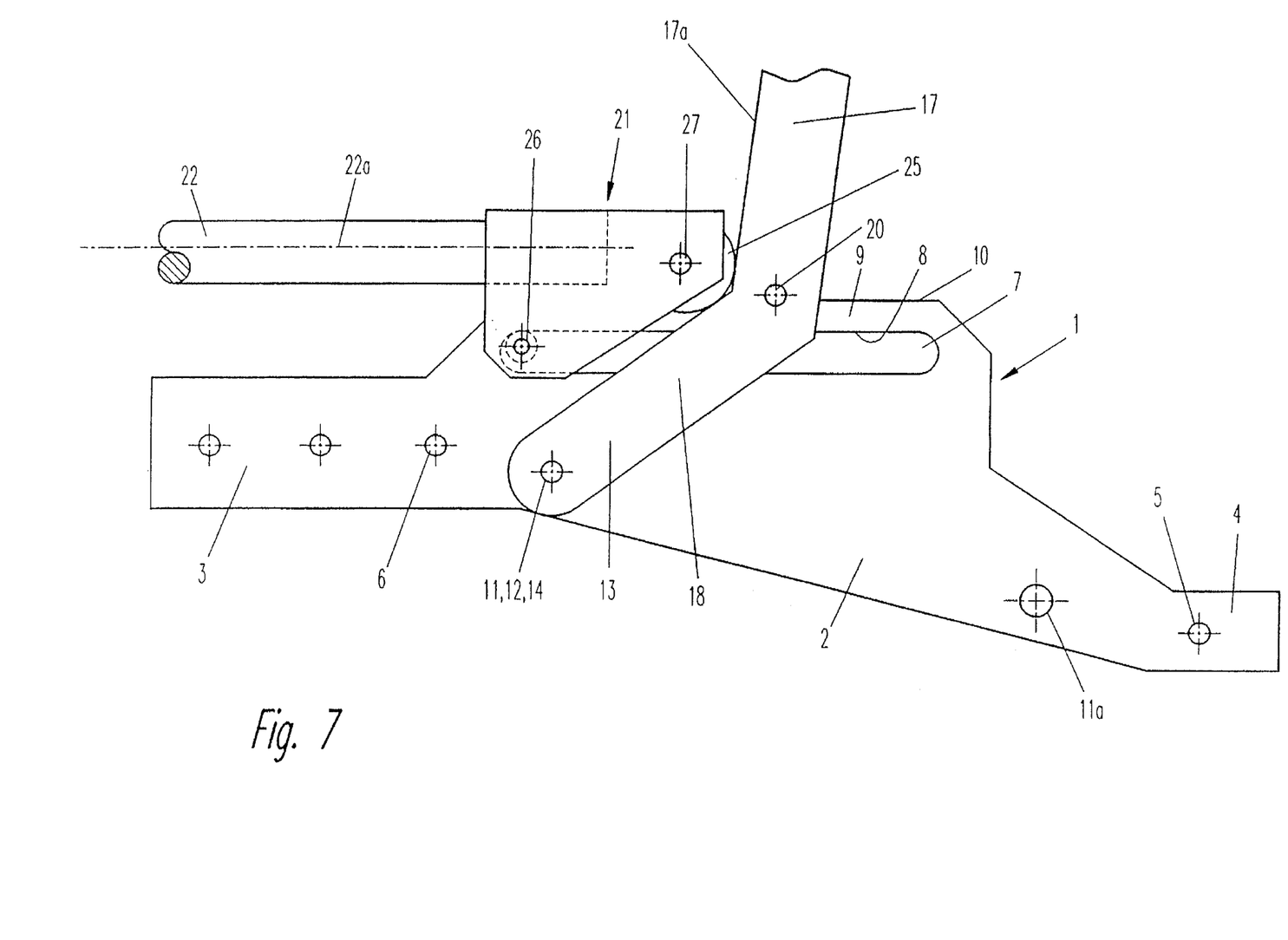
FIG. 7 is a side view of a first embodiment of a gripping device according to the invention in an inactivated position.

The roller head 21 is then screwed onto the threaded pin 23 of the piston rod 22, and the shank 3 is connected in a suitable manner to the work cylinder to the effect that the piston rod 22 extends parallel to the groove 7, and the two tongues 30a, 30b of the roller head 21 reach into and around the body 2 of the rigid jaw 1. In this position the additional roller 26 is placed in the groove 7, and the shaft of the roller is mounted in the roller head 21 in the bore 24. Further, the first roller 25 is mounted rotatably in the roller head 21 by means of the bore 27, whereby the diameter of the first roller 25 is so dimensioned that the roller 25 will not touch the upper side 10 of the body 2. It will be understood that the additional roller 26 can roll on the inner side of the additional roller path 8 of the groove 7 in its mounted position. Finally, the mentioned gripping devices 31 are positioned on the noses 4 and 19 by means of their clamp fittings, and the gripping device is provided with guard plates for security reasons in order to prevent an operator from accidentally hurting himself by sticking a finger into the mechanism.

Such guard plates can for instance be fastened by means of the shaft 12 and a screw or pin disposed in the hole 11a.

Finally, the method of operation of a gripping device according to the invention is explained in its first embodiment.

With the work cylinder in its inactivated position the roller head 21 will assume a withdrawn position, wherein the additional roller 26 is positioned at the extreme rear of the groove 7 at the end which is closest to the shank 3 of the rigid jaw 1. Consequently, the movable jaw 13, under the influence of power exerted by the spring, will move towards the position illustrated in FIG. 7, where the distance between the gripping devices 31 of the noses 4 and 19 is the maximum possible. It should be added that the movement of the movable jaw 13 in relation to the rigid jaw 1 can be reduced by means of the above mentioned guard plates, which are attached for security reasons, and it is also possible to adapt the distance between the gripping devices 31 in accordance with the size of the hose clamps, which are to be mounted by means of the gripping device.

Figure 8:
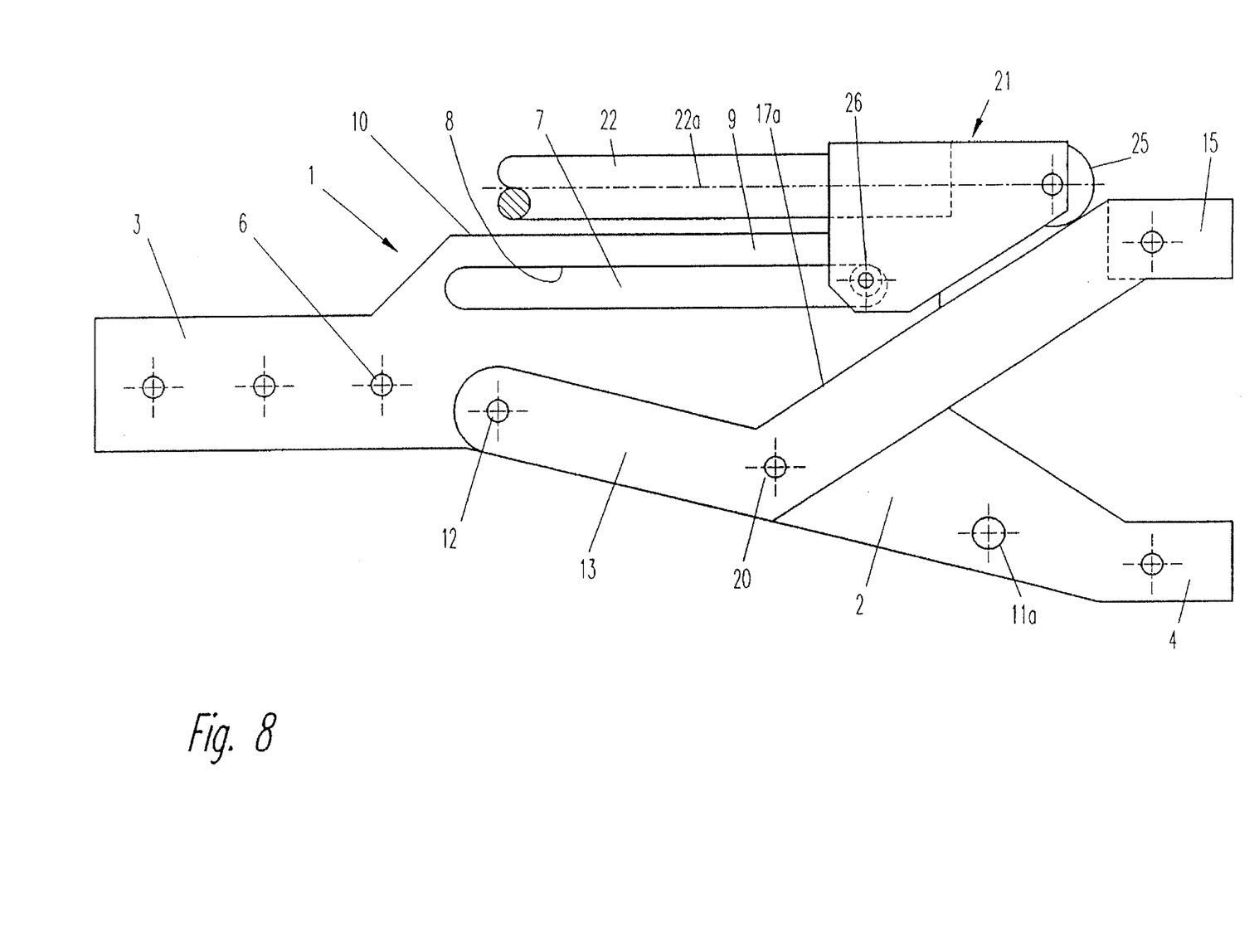
FIG. 8 is a side view of the gripping device illustrated in FIG. 7 in an activated position.

After a hose clamp has been positioned around a hose end, the gripping devices 31 of the noses 4 and 19 are placed on the two protruding ends of spring wire of the hose clamps, and the work cylinder is activated to the effect that the piston rod 22 is pushed out of the work cylinder towards the position illustrated in FIG. 8. During this movement the additional roller 26 will roll on the roller path or link, which is constituted by the inner side 8 of the groove 7, while the first roller 25 gets into contact with the roller path or link, which is constituted by the upper side 17a of the first prong 17 of the movable jaw 13, whereby the movable jaw 13 is pushed in the direction towards the rigid jaw 1.

Since the additional roller 26 rolls on the mentioned inner side 8, and the first roller 25 rolls correspondingly on the upper side 17a of the movable jaw 13, the friction between the individual parts of the gripping device is reduced to a minimum, and consequently only a minimum amount of power is required from the work cylinder in order to close together the jaws 1 and 13, and a long life of the individual parts is achieved.

The mentioned gripping devices 31 are provided with a body 32, as illustrated in FIGS. 9 and 10, with a flat pin 33 protruding from the underside of the body 32, said pin having a recess 35 at each side. When the hose clamps consist of spring wire having a circular section the bodies 32 are formed with a cavity 34 on the surfaces facing one another to the effect that it is not possible for the ends of the spring wire to slide out of the gripping devices 31 as the ends of spring wire of a hose clamp are pressed together. If, on the other hand, the spring wire has a rectangular section, a groove will be provided in the bodies 32 instead of a cavity. The gripping devices 31 are secured to the noses 4, 19 by means of clamp fittings 36a, 36b, which reach in and around the pin 33 from each side of the noses, the clamp fittings with recesses 38a, 38b engaging in the recesses 35 of the pin 33. One clamp fitting 36a has a smooth bore 37a to accommodate a screw, which is not illustrated in the drawing, said screw being capable of penetrating the holes 5 and 16 of the noses 4, 19, whereas the second clamp fitting 36b has a interior threaded bore 37b for interaction with the screw.

Instead of using a spring to open the jaws 1, 13, the movable jaw 13 may have a link, which can interact with the roller head 21 in such a manner that the movable jaw 13 is moved away from the rigid jaw 1 as the piston rod 22 is drawn into the work cylinder.

The gripping device according to the invention constitutes a unit, which can for example be secured to any work cylinder by means of a sleeve, which is not illustrated in the drawing. The sleeve may consist of a circular cylindrical bushing which has been slit up lengthwise, the slit having a width, which corresponds to the thickness of the shank 3. After the shank 3 has been inserted into the slit, the shank 3 is secured by means of screws, which are driven through the bushing and the holes 6 in the shank 3.

The work cylinder is advantageously at the end from which the piston rod 22 protrudes provided with a concentric neck around the piston rod 22, on which the sleeve or the bushing can be mounted. The gripping device thus becomes rotatable in arbitrary angular positions on the axis of the work cylinder.

A second embodiment of a gripping device is illustrated in FIGS. 11–17.

In principle, this embodiment comprises in principle the same parts as described in the first embodiment, and consequently the references for the corresponding parts to the drawings are indicated by the same reference numbers with the addition of 100.

Figure 13:
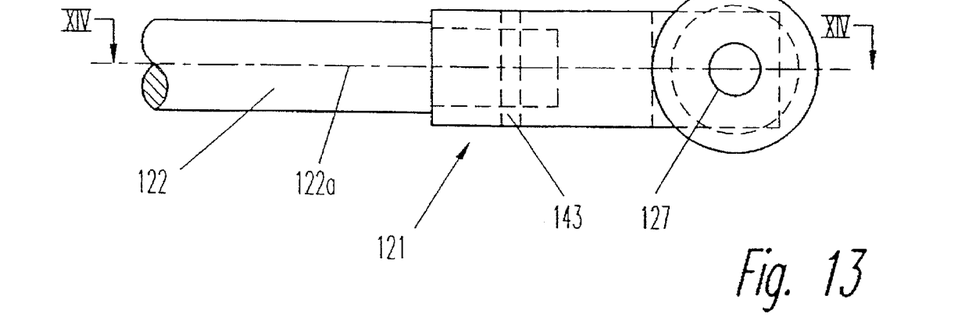
FIGS. 13–15 are illustrations corresponding to those shown in FIGS. 4–6 of a roller head in a second embodiment of a gripping device according to the invention.
Figure 14:
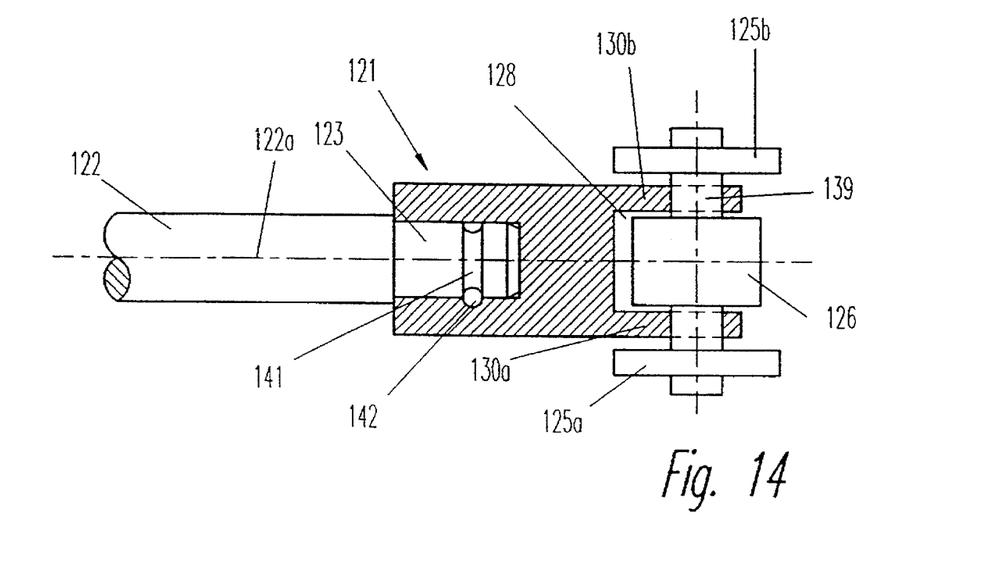
Figure 15:
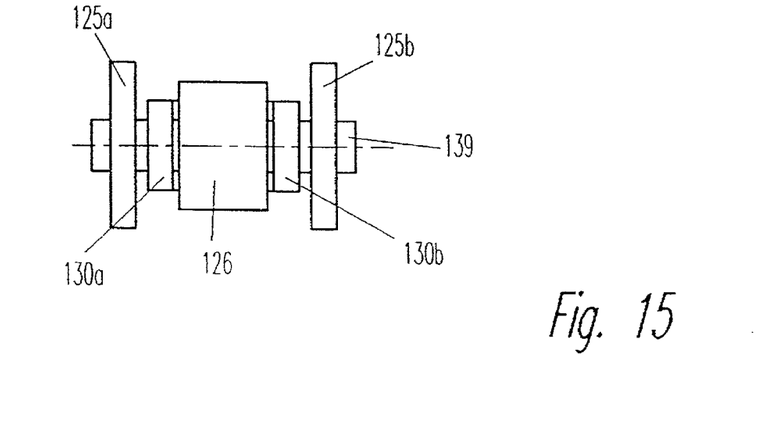
Figure 16:
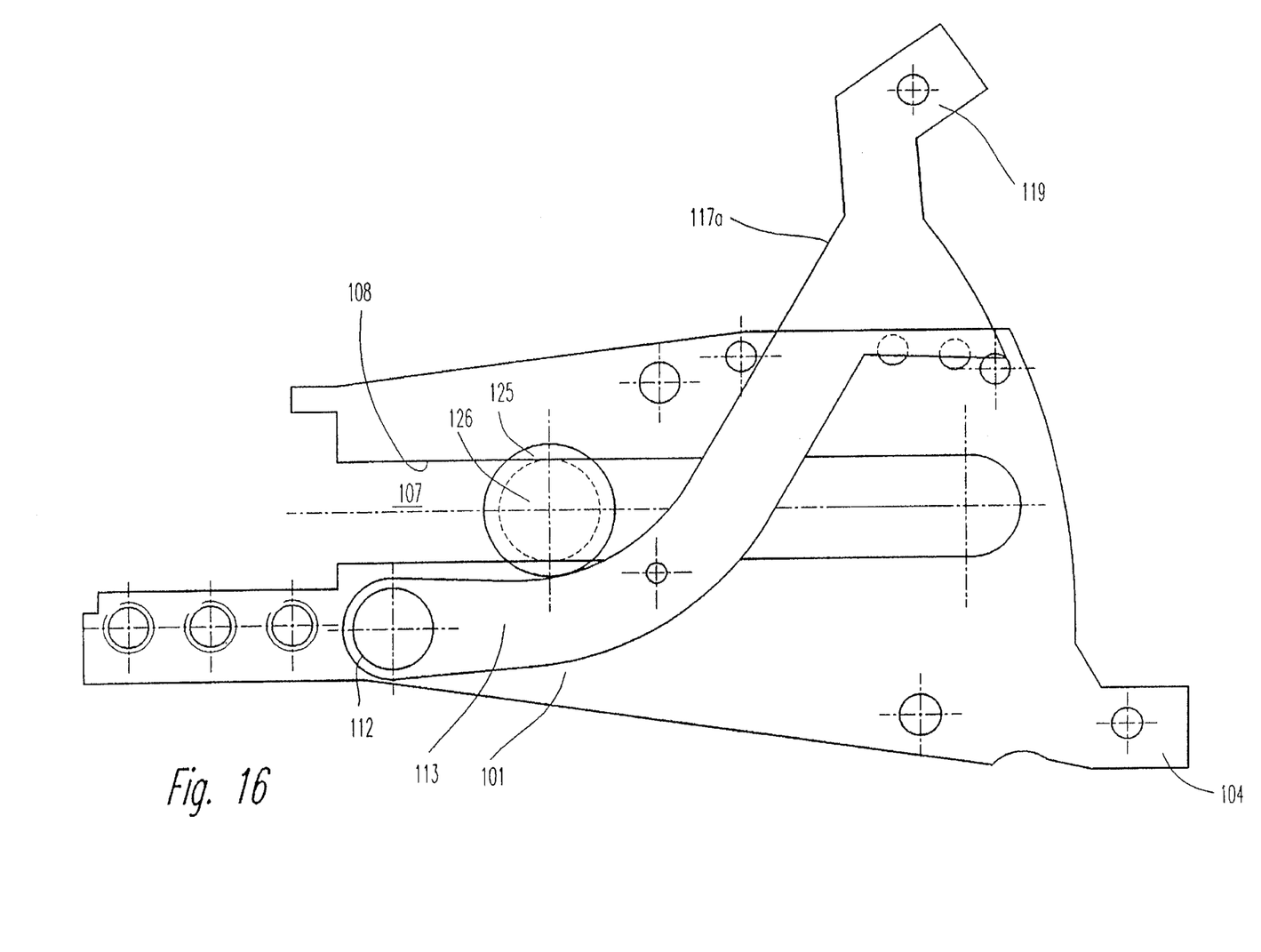
FIGS. 16–17 are illustrations corresponding to those shown in FIGS. 7–8 of a second embodiment of a gripping device according to the invention in an open respectively a closed position.

The most important difference between the first and the second embodiment is that the first roller 125 as well as the additional roller 126 are positioned mutually rotatable on a common axis 139 in the roller head 121 and are movable in a direction, which is coincident with the axis 122a of the piston rod 122.

Figure 11:
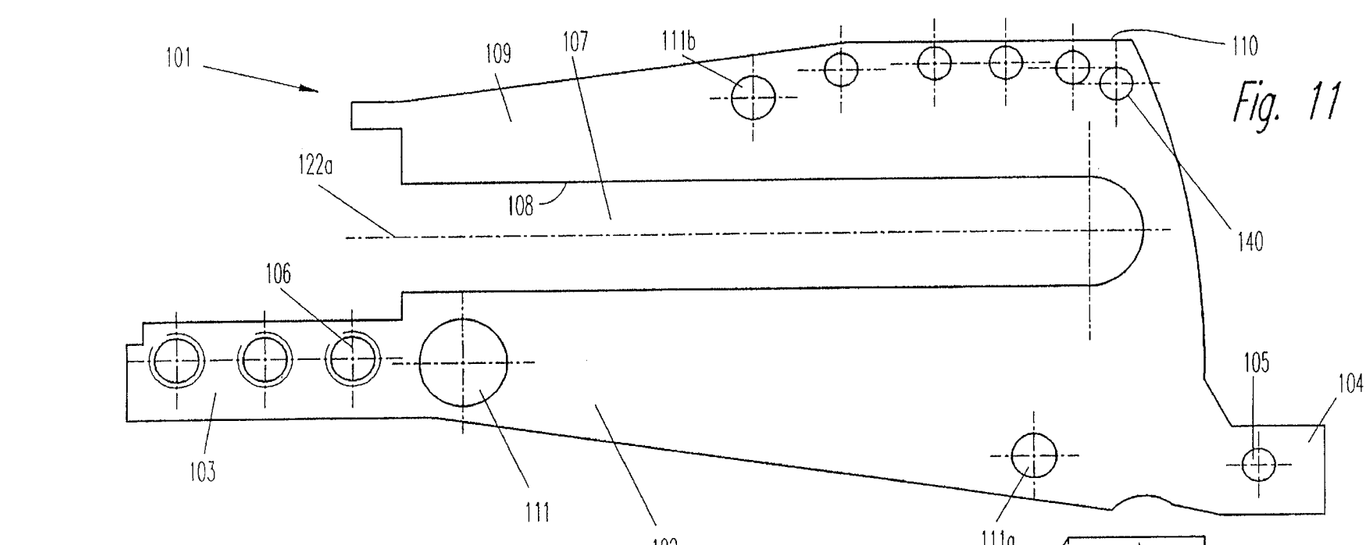
FIG. 11 is a side view of a rigid jaw in a second embodiment of a gripping device according to the invention.

The rigid jaw 101 also is provided with a groove 107 with the additional link or roller path 108 and a bore 111 for the axis 112 of the movable jaw 113, however the upper side 110 is not utilized as a link.

Figure 12:
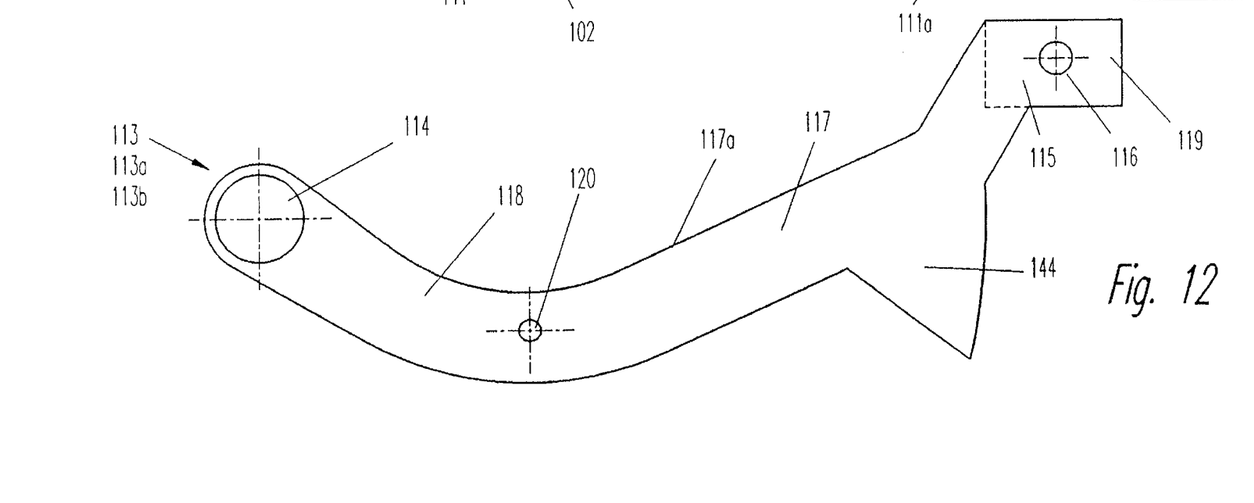
FIG. 12 is a side view of a movable jaw in the second embodiment of a gripping device according to the invention.

The movable jaw 113 is different from the jaw 13 in that the link or roller path, contrary to what is indicated in first embodiment, is not divided into two prongs by an obtuse angle, one of the prongs 17a constituting the link; the link or roller path now consists of the entire side 117a of the jaw 113 facing the additional link 108 in the rigid jaw 101.

The movable jaw 113 also has a triangular protrusion, 144 near the nose 119. This protrusion 144 is a security measure, which will close off a free area between the jaw 113 and the upper side 110 of the rigid jaw 101 in the wide open position of the gripping device. This will prevent an operator from unintentionally sticking a finger into this area before or during activation of the gripping device.

The rigid jaw 101 is provided with two bores 111a, 111b for fastening of the above mentioned and not illustrated guard plates, said bores together with the bore 111 serving the purpose of accommodating suitable means, such as pins or screws, for the connection.

The rigid jaw 101 is also provided with a number of holes 140 along its top edge for placement of a ring or a split-pin at option, which due to their protrusion cross-wise in relation to the jaw 101 can reduce the opening movement of the movable jaw 113, when the work cylinder is not activated.

The spring, which must activate the movable jaw 113 may be seated on a pin or screw, which is placed in the bore 111a, whereby one end of the spring can actuate the pin 120, and the other end may bear against the edge of the rigid jaw 101.

The pin 123 of the piston rod 122, which is formed as a threaded pin in the first embodiment, is in the second embodiment formed as a smooth, cylindrical pin 123 with a surrounding groove 141 around its mid-length. The roller head 121 is provided with a transverse bore 143 to accommodate a locking pin 142, which engage tangentially into the surrounding groove 141, whereby the roller head 121 is easily mounted on or demounted from the piston rod 122. The locking pin may be an elastic, resilient pin, allowing for removal of the roller head without removing the pin 142.

By securing the roller head 121 to the piston rod 122 in the above described manner, the roller head is prevented from rotation on the piston rod 122 due to the pair of the first rollers 125 bearing against their respective part of the prongs 113a, 113b of the movable jaw 113.

Finally, the method of operation of the second embodiment of a gripping device according to the invention will be explained.

With the work cylinder in its inactivated position, the roller head 121 will assume a withdrawn position, wherein the additional roller 126 will be positioned at the extreme rear of the groove 107 at the end, which is closest to the shank 103 of the rigid jaw 101. The movable jaw 113, therefore, will move towards the position illustrated in FIG. 16 under the influence of the power exerted by the spring, where the distance between the gripping devices 31 of the noses 104 and 119 is the longest possible. It should be added here that the movement of the movable jaw 113 in relation to the rigid jaw 101 can be reduced by means of the above mentioned holes 140 and a pin or split-pin or, alternatively, guard plates, which are attached for security reasons, whereby it is also possible to adapt the distance between the gripping devices 31 in accordance with the sizes of the hose clamps, which are to be mounted by means of the gripping device.

Figure 17:
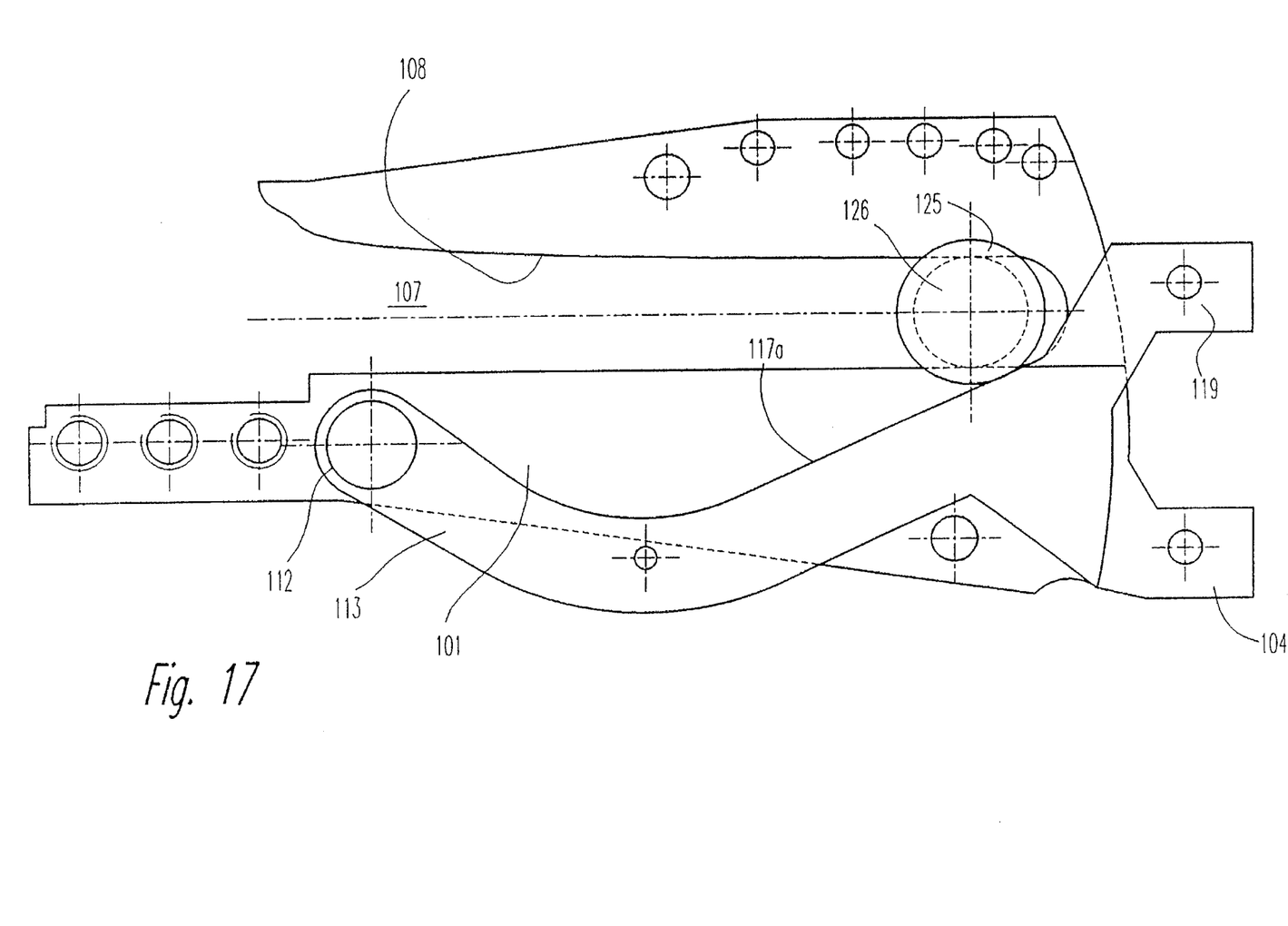

After a hose clamp has been placed in position around a hose end, the gripping devices 31 of the noses 104 and 119 on the two protruding ends of spring wire are positioned, and the work cylinder is activated to the effect that the piston rod 122 is moved out of the work cylinder towards the position illustrated in FIG. 17. During the movement the additional roller 126 will roll on the additional roller path or link, which is constituted by the inner side 108 of the groove 107, while the first roller 125 gets into contact with the roller path or link, which is constituted by the upper side 117a of the prong 117 of the movable jaw 113, as a result of which the movable jaw 113 will be pressed in the direction towards the rigid jaw 101.

Since the additional roller 126 rolls on the mentioned inner side 108, and the first roller 125 rolls correspondingly on the upper side 117 of the movable jaw 113, the friction between the individual parts of the gripping device is reduced to a minimum, and as a result only a minimum amount of power is required from the work cylinder in order to close the jaws 101 and 113, and a long life is achieved for the individual parts.

The gripping device is adapted for a common working pressure of 4 bar for the work cylinder and a maximum opening distance of 75 mm between the free ends of an inactivated hose clamp.

I claim:

1. A gripping device comprising two jaws, the first jaw being rigid and the second jaw being rotatable on a shaft provided in the first jaw, a work cylinder for moving the second jaw, a piston rod of the work cylinder being adapted to exert a force in a direction which is substantially a longitudinal direction of the jaws, and a mechanism for transferring the force of the piston rod to the second jaw at a point which is located between the shaft and free ends or noses of the jaws, the mechanism being a first roller which is secured to an outer end of the piston rod and adapted to roll in a roller path of the second jaw, and an additional roller path which is rectilinear and parallel with an axis of the work cylinder, the first roller being secured in a roller head which has an additional roller which cooperates with the additional roller path of the first jaw, the additional roller path being a side of a groove in the first jaw which is offset from an axis in the first jaw.

2. Gripping device according to claim 1, characterized in that the first jaw (1; 101) is made of a plate material.

3. Gripping device according to claim 2, characterized in that the second jaw (13; 113) comprises two parts (13a, 13b; 113a, 113b), which are so positioned in relative distance that the two parts (13a, 13b; 113a, 113b) accept the first jaw (1; 101) therebetween.

4. Gripping device according to claim 1, characterized in that the second jaw consisting of two prongs (17, 18), which between them form an obtuse angle, defining an angular space and that the roller path (17a) is constituted by the side of the prong (17) located farthest off from the axis (12) facing the angular space and the additional roller path (8).

5. Gripping device according to claim 4 characterized in that the transition from one prong (118) to the second prong (117), in the second jaw (113) extends in a curve, and that the roller path (117a) is constituted by the side of the second jaw (113a, 113b) facing the additional roller path (108).

6. Gripping device according to claim 5, characterized in that the first roller (125) and the additional roller (126) are positioned rotatably on a common shaft (139), which extends transversly of the axis (122a) of the piston rod (122).

7. Gripping device according to claim 1, characterized in that the first roller (25) is positioned in the direction of the axis (22a) of the piston rod (22) and that the additional roller (26) is positioned closer to the work cylinder and closer to the movable jaw (13) than the first roller (25).

8. A gripping device comprising two jaws, the first jaw being rigid and the second jaw being rotatable on a shaft provided in the first jaw, a work cylinder for moving the second jaw, a piston rod of the work cylinder being adapted to exert a force in a direction which is substantially a longitudinal direction of the jaws, and a mechanism for transferring the force of the piston rod to the second jaw at a point which is located between the shaft and free ends or noses of the jaws, the mechanism being a first roller which is secured to an outer end of the piston rod and adapted to roll in a roller path of the second jaw, and an additional roller path which is rectilinear and parallel with an axis of the work cylinder, the first roller being secured in a roller head which has an additional roller which cooperates with the additional roller path of the first jaw, the second jaw consisting of two prongs which form an obtuse angle defining an angular space, the roller path constituted by a prong side located farthest off from the axis facing the angular space and the additional roller path.

9. A gripping device comprising two jaws, the first jaw being rigid and the second jaw being rotatable on a shaft provided in the first jaw, a work cylinder for moving the second jaw, a piston rod of the work cylinder being adapted to exert a force in a direction which is substantially a longitudinal direction of the jaws, and a mechanism for transferring the force of the piston rod to the second jaw at a point which is located between the shaft and free ends or noses of the jaws, the mechanism being a first roller which is secured to an outer end of the piston rod and adapted to roll in a roller path of the second jaw, and an additional roller path which is rectilinear and parallel with an axis of the work cylinder, the first roller being secured in a roller head which has an additional roller which cooperates with the additional roller path of the first jaw, the first roller being positioned in the direction of the axis of the piston rod, the additional roller being positioned closer to the work cylinder and closer to the movable jaw than the first roller.

* * * * *